(12) United States Patent
Hague et al.

(10) Patent No.: US 10,032,022 B1
(45) Date of Patent: Jul. 24, 2018

(54) SYSTEM AND METHOD FOR SELF-PROTECTING CODE

(71) Applicant: JPMorgan Chase Bank, N.A., New York, NY (US)

(72) Inventors: Jeffrey Hague, New York, NY (US); John D. Rouse, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 125 days.

(21) Appl. No.: 14/984,556

(22) Filed: Dec. 30, 2015

Related U.S. Application Data

(60) Provisional application No. 62/098,817, filed on Dec. 31, 2014.

(51) Int. Cl.
   *G06F 21/56* (2013.01)
   *G06F 21/57* (2013.01)

(52) U.S. Cl.
   CPC .......... *G06F 21/562* (2013.01); *G06F 21/572* (2013.01); *G06F 2221/033* (2013.01)

(58) Field of Classification Search
   CPC . H04B 1/38; G06F 21/56; G06F 11/00; G06F 21/51; G06F 21/57; G06F 21/562; G06F 21/577; H04M 1/66; H04M 1/68; H04M 3/16; H04M 3/382; H04L 63/08; H04L 63/10; H04L 63/1416; H04L 63/1433; H04W 12/12
   USPC ....... 455/410, 115.1, 404.2, 411, 456.1, 521; 726/23, 25; 713/155; 370/354
   See application file for complete search history.

(56) References Cited

U.S. PATENT DOCUMENTS

| | | | | |
|---|---|---|---|---|
| 7,650,639 B2 * | 1/2010 | Kramer | ................. | G06F 21/562 726/23 |
| 7,860,486 B2 * | 12/2010 | Frank | ..................... | H04L 63/08 455/410 |
| 8,695,098 B2 * | 4/2014 | Pistoia | .................. | G06F 21/577 726/25 |
| 9,576,130 B1 * | 2/2017 | Book | ..................... | G06F 21/56 |

* cited by examiner

*Primary Examiner* — Thanhnga B Truong
(74) *Attorney, Agent, or Firm* — Calfee, Halter & Griswold LLP

(57) ABSTRACT

Embodiments of the presently disclosed invention provide a method and system for providing self-protecting code. In particular, embodiments provide security modules that may be embedded in a plurality of apps installed on one or more devices. In one embodiment, a central app security system is provided that facilitates the deployment and management of the formation of apps embedded with the security module. With the help of the embedded security modules, the plurality of apps, which may be referred hereinafter as a "secured formation" of apps, perform automated and dynamic scans of other apps within the same formation to ensure the integrity of each app is maintained. Each app in the secured formation may also detect viruses, malware, spyware, and other malicious software contained in the secured formation and perform curative operations in response. In this manner, the apps in any given secured formation collectively ensure that sensitive user information is protected.

24 Claims, 12 Drawing Sheets

SYSTEM AND METHOD FOR SELF-PROTECTING CODE

FIELD OF THE INVENTION

Embodiments of the present invention are generally related to systems and methods for providing self-protecting code, and in particular, for providing a plurality of applications with embedded modules capable of collectively providing protection against viruses, malware, and spyware and other malicious software.

BACKGROUND OF THE INVENTION

With the popularization of smartphones, tablets and other mobile devices, mobile applications, or "apps," have become household terms. Apps are computer applications that execute on mobile devices. Like applications that execute on traditional computing devices, apps allow users to perform a wide range of actions, from simple (e.g., access the Internet, take a photo) to specialized (e.g., file tax forms, play a board game). For instance, many banking institutions provide customers with apps to access the user's bank account to review their balance, transfer money, pay bills, and perform other related actions. Similarly, many financial institutions also provide customers with apps that can help users review the performance of the stock markets, complete trades, configure automated trades using user-defined limits and stops, and perform other intricate trading operations.

While the number of apps has grown exponentially in recent years, so has the rate of cybercrime. Hackers have exploited security flaws in computer servers, apps and other systems to gain access to sensitive company information and consumer financial information, stealing customer credit card information, social security numbers, private emails, and other sensitive and valuable information in the process. A recent study conservatively estimates the costs of cybercrime to the global economy to be greater than $400 billion.

With more than 2 billion devices shipped annually, smartphones and mobile devices are one of the primary targets of cybercrime. Apps are particularly vulnerable because they allow unauthorized users direct access to valuable information found on user devices. Furthermore, apps can be made available to the public with little to no cost. As a result, many apps available on the marketplace contain viruses, malware, spyware, and other malicious code.

Indeed, many apps that provide users with innocuous functionality also contain malicious code. For instance, an app may allow a user to use the phone as a flashlight, perform calculations using a calculator, or even play a game, but, at the same time, may also access and exfiltrate sensitive user information without the user's knowledge. Many of these apps may steal a user's device identification, address book contacts, calendar information, web browsing history, and amongst others, information that is considerably valuable.

Many other malicious apps are created to have a direct resemblance to genuine popular apps to trick common users into downloading the app, entering private information and providing the app with access to even more valuable information. For example, app providers with malicious intent often attempt to create apps that have the look, feel, and sometimes the functionality of a genuine app. Apps that provide users with banking capabilities are especially prone to this cloning exploit. Once installed, the app may ask the user to enter his or her banking information in order to "access the account," stealing the user's log-in information in the process. The app may go further and access account information automatically and perform money transfer requests. The app may automatically transmit credit card information, social security numbers and other information to a remote site as well.

A third method in which users of smartphones and mobile devices may be at risk is through apps that modify existing apps, thereby gaining access to the same sensitive information. For instance, when a user downloads a "flashlight" app, the app will not only provide the user with flashlight functionality, but could also modify an existing genuine banking app already on the user's device. The exploitation may force the banking app to forward the user's banking account number and login information to a remote server. In these instances, it is extremely difficult to detect that the app includes malware because it otherwise has all of the attributes of the authentic app.

With new types of exploits, companies and app developers have developed various solutions in an attempt to combat malicious apps. These solutions, however, have many shortcomings.

For instance, many app stores now perform a scan of each app before they are publicly released for download. Likewise, many security companies have developed scanning software that attempts to detect viruses, malware, and other malicious software. The detection software may perform analysis through static analysis—which involves the review of the app source code for exploitive behaviors—and dynamic analysis—which involves running the app to detect any suspicious behavior performed by the app. Even with these techniques, however, many apps found on app stores still include malicious operations because malicious code detection accuracy can vary greatly.

Even more, it is often difficult to recognize that an app's behavior should be flagged as malicious. For instance, it is difficult to detect that a calendar app's access to the user's calendar is an attempt to steal the user's information instead of a genuine, innocent purpose. In addition, scanning software is effective only if users download the scanning software or otherwise perform the scan of his or her phone. The majority of users, however, have little awareness that scanning software even exists, much less awareness to install and perform the necessary security checks.

To protect consumers against replicated apps, app providers also attempt to scan the app stores for new apps that resemble the apps that they have developed by examining new apps that may have the same or similar look and feel, similar name, and other identifying features. However, it is very difficult to quickly and accurately detect apps that may "look" the same to a user, especially when more than 20,000 apps are released into the marketplace per year.

Accordingly, there is an essential need for a solution that can protect users of smartphones, mobile devices, and other computing devices from viruses, malware, and other malicious software. The solution should automatically and dynamically protect users with minimal user interaction. The solution should also protect authentic apps installed on devices from being infected with malware.

Accordingly, the presently disclosed invention provides a long felt need for self-protecting code that is capable of dynamically protecting a plurality of apps found on user devices.

SUMMARY OF THE INVENTION

The present invention fulfills long-felt needs by providing a method and system for providing self-protecting code, and in particular, for implementing a plurality of applications with self-securing capabilities against viruses, malware, and spyware and other malicious software.

In one aspect of the present invention, a system for providing an app formation made up of a plurality of apps is disclosed that includes non-transitory computer memory and at least one computer processor. The non-transitory computer memory stores at least executable computer instructions and an app database comprising identifying information of at least the plurality of apps associated with the app formation. Furthermore, the computer processor may be programmed to execute executable computer instructions to perform operations associated with an identification engine and a scanning engine. For instance, The app identification engine executes executable computer instructions using the at least one computer processor at the system to identify the plurality of apps on the user device, where each of the plurality of apps on the user device includes an embedded security module that designates the app formation. Furthermore, the scanning engine is also capable of performing a number of operations, including receiving a first request from a code module embedded in a first app associated with an app formation. In response to receiving, over a communication channel, a first request from a code module embedded in a first app associated with the app formation, the at least one computer processor is automatically activated to perform various automated operations, including processing the first request from the first app by scanning each of the other apps associated with the app formation for malicious code. Similarly, the scanning engine is also capable of receiving a second request from a code module embedded in a second app associated with the app formation and processing the second request from the second app by scanning each of the other apps associated with the app formation for malicious code. The scanning engine also automatically transmits a first response to the first request based on said processing step.

In another aspect of the invention, a computer readable storage medium is disclosed that includes instructions of a first code module of a first app associated with a predetermined set of apps that, when executed on a first computing device, cause the first computing device to perform a number of operations. For instance, the first computing device receives, over a communication network, identifying information relating to the predetermined set of apps and an activation of the first app on the first computing device. In response to receiving, over a communication network, identifying information relating to the predetermined set of apps and the activation of the first app on the first computing device, at least one processor of the first computing device is automatically activated to identify, using at least one processor of the first computing device, other apps on the first computing device and determine, based on step of identifying, other apps on the first computing device associated with the predetermined set of apps. In addition, each of the identified apps is scanned on the first computing device associated with the predetermined set of apps to detect malicious code and at least one of the identified apps on the first computing device associated with the predetermined set of apps includes malicious code is detected. Furthermore, the at least one malicious code is automatically removed from the device.

In yet another aspect of the invention, a method for providing an app formation comprising a plurality of apps embedded with a security module is disclosed. The method includes a step of identifying, using at least one computer processor, the plurality of apps on the user device, where each of the plurality of apps on the user device includes an embedded security module that designates the app formation. Furthermore, the method includes steps of scanning apps associated with the app formation for malicious code based on the execution of a security module embedded in a first app and a second app associated with the app formation.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a method and system for providing self-protecting code. In particular, embodiments provide security modules that may be embedded in a plurality of apps installed on one or more devices. With the help of the embedded security modules, the plurality of apps, which may be referred to hereinafter as a "secured formation" of apps, perform automated and dynamic scans of other apps within the same formation to ensure the integrity of each app is maintained.

Each app in the secured formation may also detect viruses, malware, and spyware and other malicious software contained in the secured formation and perform curative operations in response. Furthermore, embodiments further provide embedded security modules capable of dynamically scanning other apps on the device to detect apps that resemble in look and feel to apps in the formation. In this manner, the apps in any given secured formation collectively ensure that sensitive user information is protected.

In one embodiment, a central app security system is provided. The central app security system includes engines that facilitate the deployment and management of the formation of apps embedded with the security module. The system may further include engines that manage the integrity and malicious scanning capabilities of the apps in one or more secured formations. The central app security system may include a database that provides attributes of each app in a secured formation. Furthermore, the system may include a database that provides malicious code signatures. Further details of the system are provided hereinafter.

Figure 1:
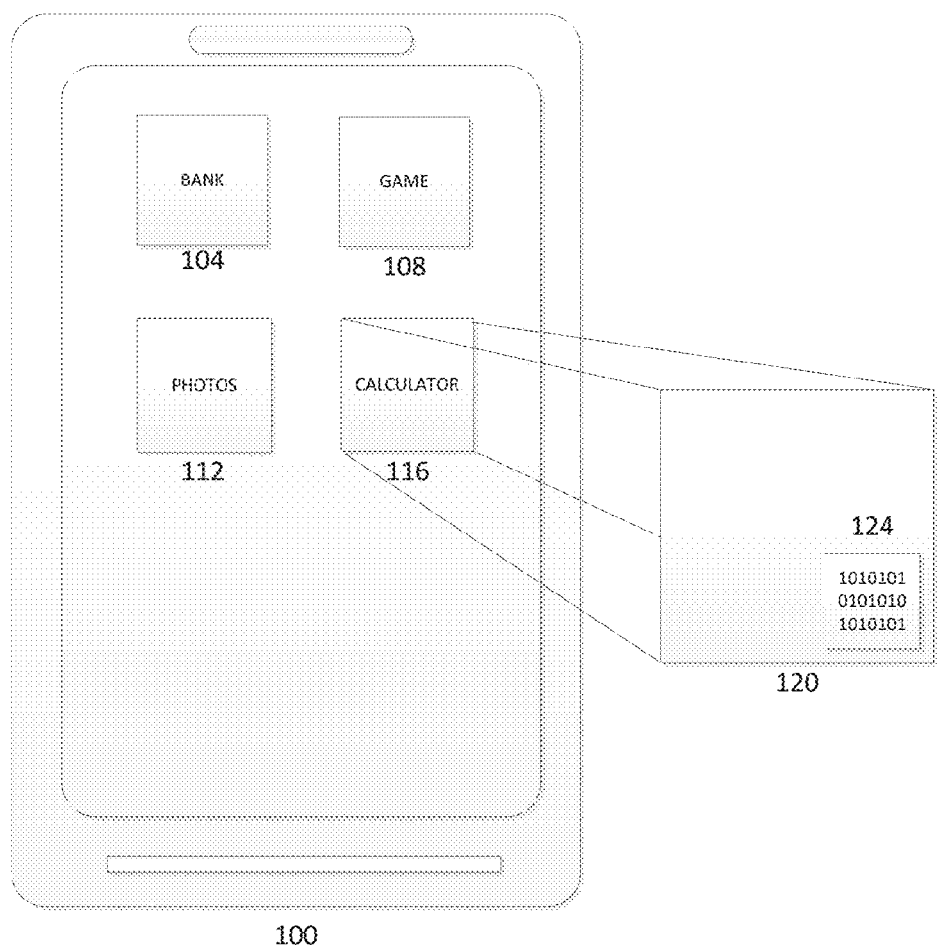
FIG. 1 is a block diagram illustrating a plurality of apps with self-protecting code on a user mobile device.

FIG. 1 depicts a block diagram illustrating a plurality of apps with embedded security modules on a user mobile device in accordance with an embodiment of the present invention. FIG. 1 depicts a smartphone device 100 comprising of apps 104, 108, 112 and 116. The apps may be operational on any mobile or non-mobile operating system, including Apple iOS, Google Android, and Microsoft Windows Mobile. The apps may provide any number of functionality available for users of the smartphone. For instance, the app may provide financial management capabilities, allow the users to play a game, or edit his or her photos.

Each of the apps, 104, 108, 112 and 116, includes an embedded security module in accordance with the presently disclosed invention. Specifically, as illustrated by box 120, app 104 may include a code module 124 capable of providing the self-protecting code functionality discussed further below. The module may be embedded or otherwise associated with the apps 104, 108, 112 and 116. For instance, the security module may be embedded into the mobile app during development by a software developer of the app. A software development kit (SDK) may facilitate the embedding of the security module during software development of the app. In another embodiment, the security module may be implemented as a plug-in, embedded app, application program interface (API) or other techniques known in the art. In yet another embodiment, the security module is integrated into an app such that portions of the module may be dispersed in various portions of the app.

The embedded security module, when executed, performs the operations described in detail herein. The description of the functionally of the embedded security module described herein is provided with reference to the app with which the module is embedded. For instance, while the examples below may describe that an "app" performs a scan, a person of ordinary skill in the art will recognize that the security module embedded in the app is at least partly responsible for such operation.

The embedded security module may include an identifier that uniquely identifies one or more secured formations to which the associated app belongs. This allows a software developer to quickly select and associate a plurality of apps with one or more secured formations. Thus, for example, a bank that provides its customers with a suite of apps may associate all of these apps with a secured formation. Similarly, a company that provides its employees with a number of apps, such as email, database access, chat and other internal apps, can place all these apps in the same formation.

Figure 2:
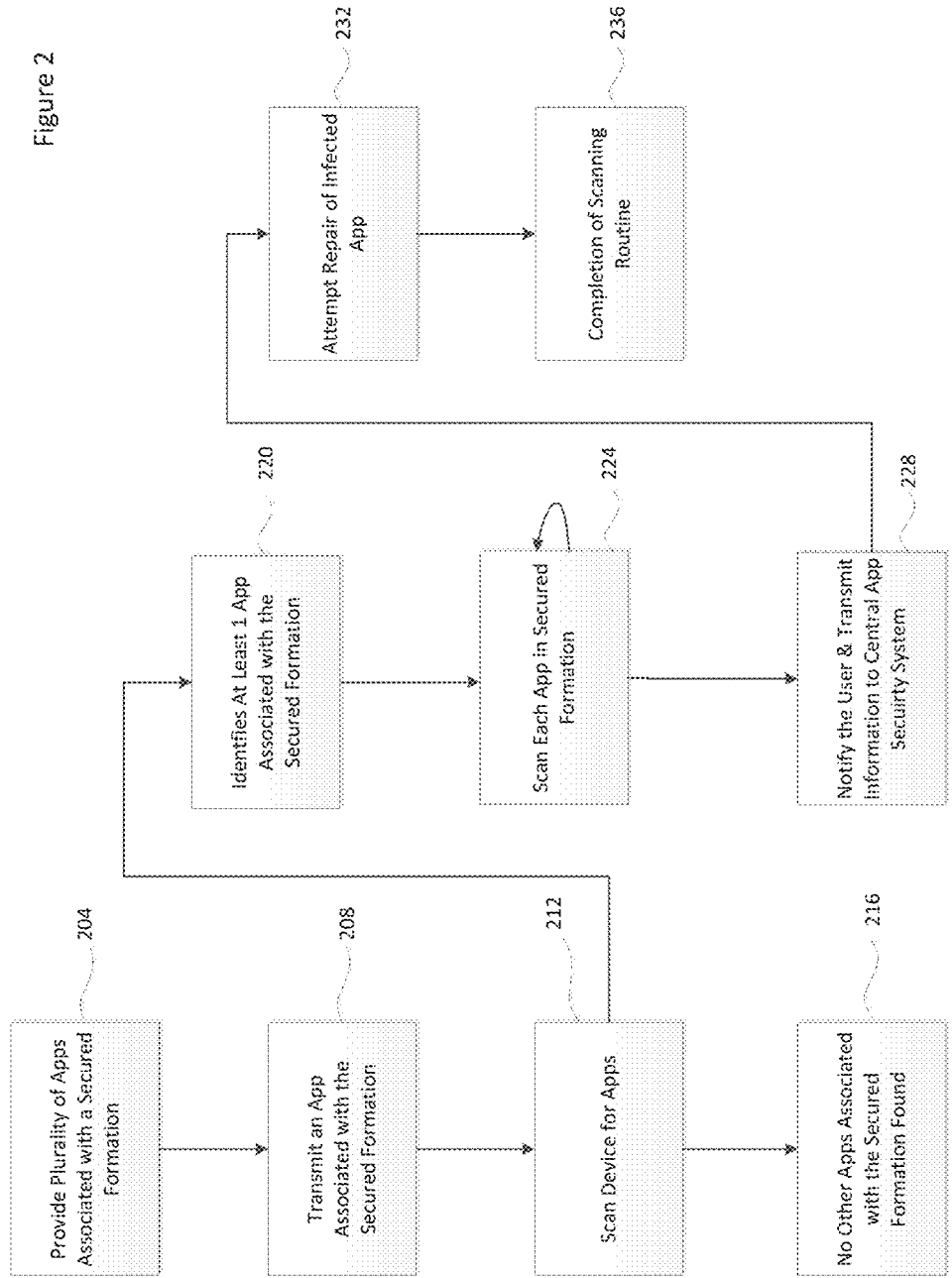
FIG. 2 is a flow chart illustrating an exemplary method for providing a plurality of apps with self-protecting code in accordance with an embodiment of the present invention.

FIG. 2 is a flow chart illustrating an exemplary method for providing a secured formation of apps with embedded security modules in accordance with an embodiment of the present invention. At 204, a plurality of apps associated with a secured formation are provided on an app store, such as the Apple App Store, Google Play Store, Microsoft Window Store, and other application sources. In this example, the apps 104, 108, 112, 116 from FIG. 1 are made available to users for download from the app store, with each app having an embedded security module.

At 208, app 104 is downloaded and installed on a user device. At 212, in response to a user initiating the app 104, the app scans device 100 for other apps installed on the device 100. In at least one embodiment, in response to receiving the app 104 over a communication channel, the that the processor of the user device may automatically activated to perform various operations described herein, including analyzing the devices for apps installed on the device 100. Indeed, as described herein, a person of ordinary skill in the art would recognize that the processor of the user device may automatically activated to perform any of the operations described herein in response to one or more events, including the receiving of one or more apps, and/or the activation of the app over the communication channel. For example, the user device may be automatically activated to identify other apps in the formation, analyze other apps in the formation, and detect malicious apps, all in automated fashion in response to one or more events, as described herein.

The scan may be performed in the background and as a secondary operation to the primary app operation. Thus, at 212, the app may be programmed to automatically detect during a period in which processor and memory resources are not currently being used and may automatically call a portion of the embedded security module to begin the scanning algorithm. In other embodiments of the present invention, the scanning process is initiated automatically by the device or the central app security system via one or more communication channel. The initiation may also be scheduled on a pre-determined basis (e.g., hourly, daily, weekly), with or without the execution of the app in which the security module is embedded.

At 216, if an app determines that there are no other apps on the mobile device with embedded security modules, the app may discontinue any further scanning operation until an app with embedded security module is detected.

At 220, in response to the scan, app 104 automatically determines that there are other apps on the device that are associated with app 104. Specifically, the embedded security module, when executed, recognizes that other apps are part of the same formation. App 104 determines that apps 108, 112, and 116 are part of the same app formation by examining the secured formation identifier designed by each embedded security module.

At 224, based on the determination at 220, app 104 performs a scan of each of the apps in the designated secured formation. App 104 may scan app 108, 112 and 116 in an iterative fashion to detect viruses, malware, spyware, or other malicious code or content in each app. The app 104 may also detect if an app has been modified in any way.

Thus, at 224, app 104 may automatically detect that an app (e.g., app 116), includes a virus, malware, spyware or other malicious code. In one embodiment, the scan for malicious apps is broad and may include an identification of apps that perform capabilities that are potentially invasive, including accessing a user's calendar, contact list, email, photo album, location; transmitting ("exfiltrate") information to a third party server; call a known app that is invasive or malicious; use the device's microphone, camera, or other features; and others. App 104 may also detect that app 116 may have been modified by another malicious app downloaded by the user.

Figure 5:
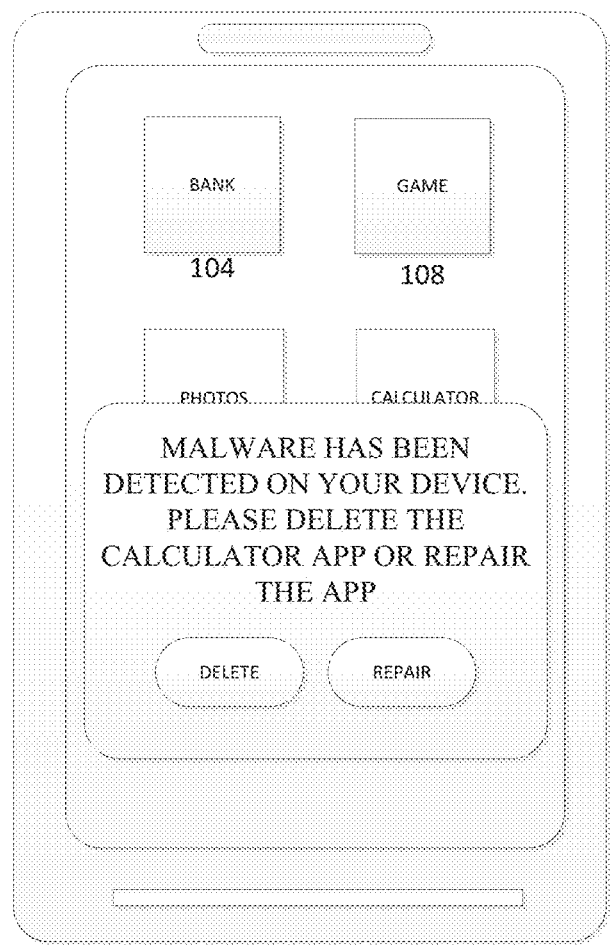
FIG. 5 depicts an exemplary mobile device containing a plurality of apps with self-protecting code in accordance with an embodiment of the present invention.

At 228, in response to detection that an app in the app formation has been modified and/or infected with a virus, malware, spyware and other malicious code, the app may automatically notify the user and transmit the information to the central app security system. As shown in FIG. 5, the user may be notified that "!! MALWARE HAS BEEN DETECTED ON YOUR DEVICE. PLEASE DELETE THE CALCULATOR APP OR REPAIR THE APP". In one embodiment, the user may select an option to delete the app from the device or attempt to perform a repair of the app.

At 232, the app 104 may attempt to repair the infected app. In one embodiment, where repair of the app is unsuccessful, the app may reinstall all or part of the app on the user's device. At 236, the app 104, having scanned each of the apps in the formation, the app scanning routine terminates.

Figure 3:
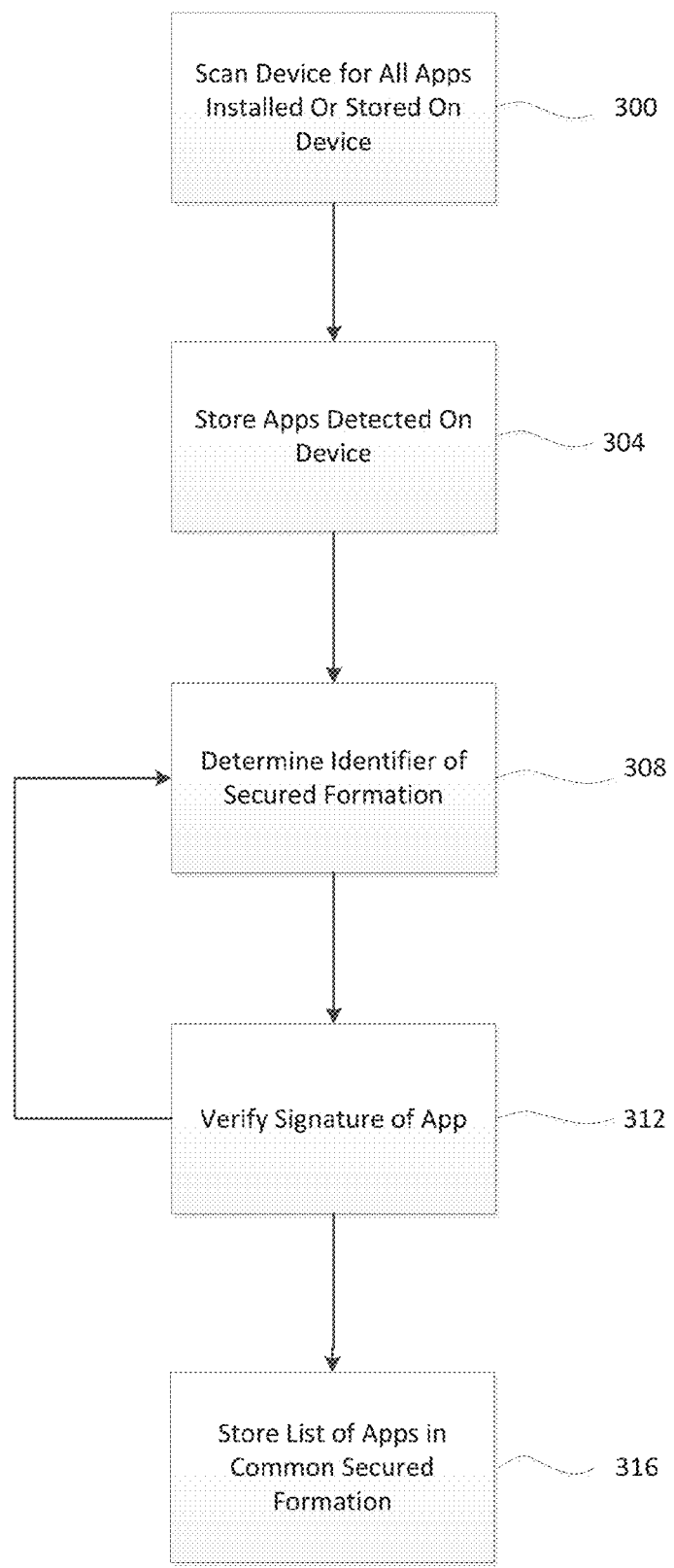
FIG. 3 is a flow chart illustrating an exemplary method for detecting other apps in a device in accordance with an embodiment of the present invention.

FIG. 3 is a flow chart illustrating an exemplary method for detecting other apps in a device in accordance with an embodiment of the present invention. As discussed above with reference to FIG. 2, an app performs (e.g., at 212 of FIG. 2) a scan of a device for other apps and identifies the apps associated with a designated secured formation. The app may then perform scans for viruses, malware, spyware, or other malicious code or content. FIG. 3 illustrates steps that may be performed as part of the app scanning and identification process in accordance with an embodiment of the present invention.

At 300, the app may automatically scan all apps installed or stored in the device. Thus, app 104 may detect that there are 20 other apps on device 100, including app 104, 108, 112, and 116 (FIG. 1). In one embodiment, the app may utilize an API functionality provided by the mobile device operating system to retrieve a list of the apps installed on the device. At 304, the app stores in memory a list of the apps detected.

At 308, the app 104 detects, in iterative fashion, whether a given app includes an embedded security module. That is, the app 104 determines whether a given app is associated with a common secured formation. In an embodiment, the app 104 scans the attributes file(s) of the app, which may describe various information related to the app, including, for example, the development region, the displayed name of the app, the bundle executable, the identification of the app icon, the version, the supported operating system version, the display size of the app, copyright information, and so on. In one embodiment, an app determines whether other apps are or should be associated with a common secured formation based on the content of each file and determine automatically that an app is and should be associated with the same formation.

The app may also identify an identification number that uniquely identifies apps that are associated with a given secured formation. For instance, a bank may associate all of its apps that include embedded security modules with a unique identifier allowing all apps in the formation to readily identify other apps in the same secured formation. Thus, in these embodiments, the app 104 may first retrieve the unique identifier (from the app itself or from a remote source), and compare the retrieved unique identifier with another app to detect whether other apps have the same unique identifier.

Where the app identifies that an app could designate a common secured formation, the app may perform, at 312, an optional step of generating a signature of the app by using any combination of a hash function, app files and attributes associated with the app being scanned. The app 104 may verify the signature with information stored locally of apps known to be in a common secured formation or remotely at the central app security system. This function may also be performed in place of scanning using a common identifier. For instance, the apps may have a common or associated App ID.

An App ID may be a two-part string used to identify one or more apps from a single development team and may consist of a development ID and a bundle ID search string, with a period (.) separating the two parts. The development ID may be supplied by a third party and is unique to a specific development team, while the bundle ID search string is supplied by you to match either the bundle ID of a single app or a set of bundle IDs for a group of apps. As another example, the apps may be identifiable by applicationID or packageNames, such as those used by the Android operating system. Other alternatives identification techniques may be used to efficiently identify the associated apps.

At 316, app 104 detects that app 108, 112 and 116 all belong to the same formation and may store the list of apps in the formation for subsequent uses.

Figure 4A:
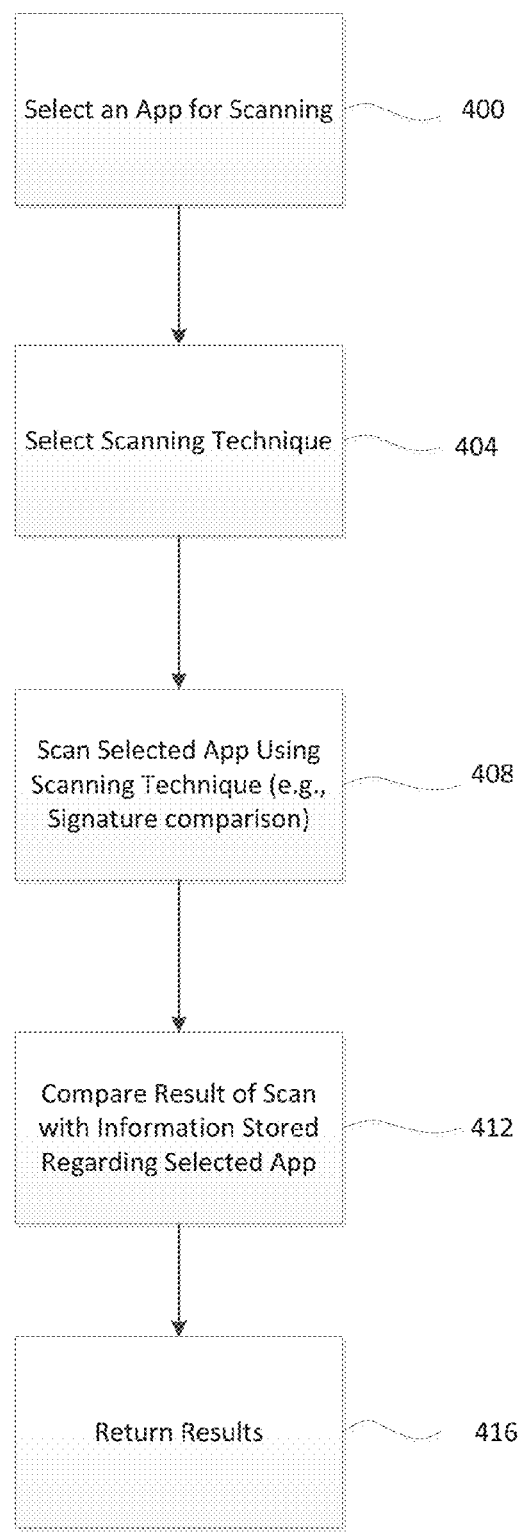
FIG. 4A is a flow chart illustrating an exemplary method for scanning a formation of apps with embedded security modules in accordance with an embodiment of the present invention.

FIG. 4A is a flow chart illustrating an exemplary method for scanning a formation of apps with embedded security modules in accordance with an embodiment of the present invention. As discussed above with reference to FIG. 2, an app performs (e.g., at 224 of FIG. 2) a scan of other apps in a given formation to detect for viruses, malware, spyware, or other malicious code or content in each app. The app may also detect if an app has been modified in any way. FIG. 4 illustrates steps that may be performed as part of the scanning process for malicious code (e.g., at 224) in accordance with embodiments of the present invention.

The method begins at 400. Having identified all of the apps in the secured formation, app 104 selects an app to scan for malicious code. In one preferred embodiment, the app 104 will select each app in a common secured formation in iterative fashion and perform the operations described herein with each app. In at least one embodiment, the app 104 may only select a subset of apps for scan at the moment and may schedule scan of the remaining apps for a later time. The app 104 may also designate the scanning of other apps at a later time. Thus, for example, app 104 may cause app 108, when it is initiated, to scan apps 112 and 116 when it is initiated by the user or at a scheduled interval. The selection of the app to scan, and the order at which the apps are scanned may also be based on context. Thus, smaller size apps or apps that have not been scanned recently may be scanned first.

In one embodiment, the device or the central app security system stores a universal list of apps associated with a common formation for each device. As each app is added to a device, the app may automatically add itself to the list. Therefore, in these embodiments, the steps of identifying other apps may not be necessary.

At 400, the app 104 may also scan the app to detect general information of the app, including the name of the app, creator of the app, source, creating company, version, identification number, and other information.

At 404, the app selects one or more scanning techniques for a given app. Thus, in preferred embodiments of the present invention, the app is capable of performing any one of several scanning techniques. In a preferred embodiment, the app is defaulted to perform a signature scanning technique. In other embodiments, the app may also select from any one of several techniques, including the simple hash scanning technique; a thorough static analysis; dynamic analysis; or others.

The scanning technique chosen may be dependent on any number of factors, including the app currently performing the scan; the number of apps in the formation; the time since the last scan of the same type; the type of device; whether the device is plugged in; activities, processing, and resources active in the device at the time; and other attributes and in various context. Thus, the app may automatically select a technique involving minimal processing power and resources if the user is actively using the device, where power, processing power, and memory should be conserved. In contrast, the app may select a thorough static analysis technique where the mobile device is plugged in and is idle.

At 408, where the standard signature scanning technique is chosen, the app 104 scans the selected app to generate a unique signature of the app. In embodiments of the present invention, the signature may be generated from any number of sources, including using a hash function, file(s) of the app, and/or attributes of the app. To conserve data, the app may also scan only portions of the app, or portions of the app that are determined more likely to be modified to generate the signature of the app.

For instance, different hash functions may be used, including, but not limited to: MD2, MD4, MD5, MD6, HAVAL, SHA-0, SHA-1, SHA-256, SHA-512, SHA-380, SHA-2254, SHA-3, GOST, Tiger, Whilrpool, RIPEMD (-128, -256, -160, -320) and others known and later developed. In one embodiment, this unique signature may be retrieved from the attribute file(s) of a given app. For instance, the app 104 may determine a signature from a digital certificate file; profile of the app; from the private key (PK) file of the app; as well as other attributes of the aps, such as those described above. In at least one other embodiment, the app 104 generates a signature by using one or more files found in the app. The app 104 may be configured to scan the apps for relevant features and files, including images; version information; app identification numbers; and other information. Some or all of this identifying information may be used to generate the signature.

At 412, the app 104 compares the signature and/or identifying information against information stored locally within the embedded code module. Thus, each app may contain a signature and/or other identifying information of each app known to be in the same app formation.

Figure 4B:
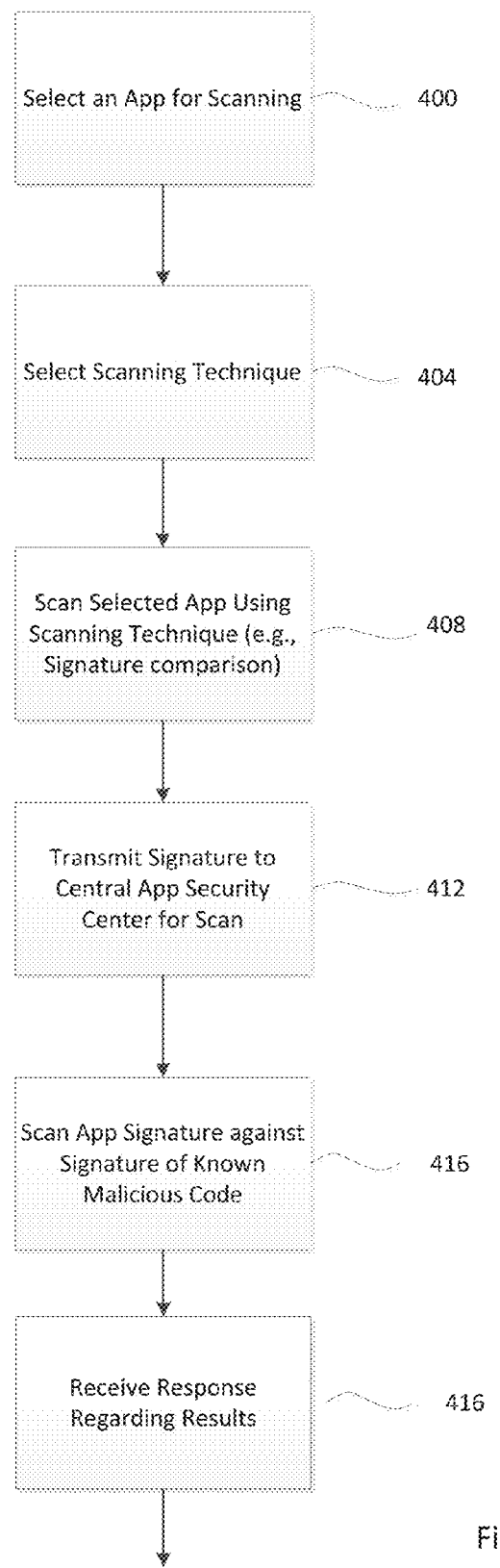
FIG. 4B is a flow chart illustrating an exemplary method for scanning a formation of apps with embedded security modules in accordance with another embodiment of the present invention.

In at least one embodiment of the present invention, the detection of malicious code and/or content is performed remotely at the central app security system. Thus, as depicted in FIG. 4B, instead of comparing the signature locally on the user's device, the app 104, at 412, transmits the signature to the central app security system along with other information of the app retrieved at 400. The transmission may be in the form of a scan request. As discussed below, the central app security system, in response to receiving the request, may respond by retrieving the relevant information from one or more app databases based on the app information received, and compare the app's signature stored at the central app security system to determine whether the integrity of the app has been compromised (e.g., includes malicious code).

In one embodiment, as discussed below, the central app security center also (or in the alternative) includes a database containing a listing of signatures of known viruses, malware, spyware, and other malicious code. Thus, in these embodiments the central app security system, at 416, also compares the signature received as part of the request from app 104 with this listing.

At 420, the central app security center transmits a response to the app 104. The response may indicate that the scanned app is genuine or that the app has been infected with or is a virus, malware, spyware or other malicious content. The response from the app security center may also provide the app 104 with the possible actions that could be taken in response.

In embodiments of the present invention, the app security center may request additional information regarding the scanned app. Thus, in these embodiments, the app security center may cause the app 104 to perform additional scanning of the app in order to gather additional information. For instance, the app security center may instruct the app 104 to perform thorough static analysis scan or dynamic analysis scan of the app and compare any scanning results against a list of signatures of known malicious code. At 428, the process of scanning the device for malicious content terminates.

Figure 6:
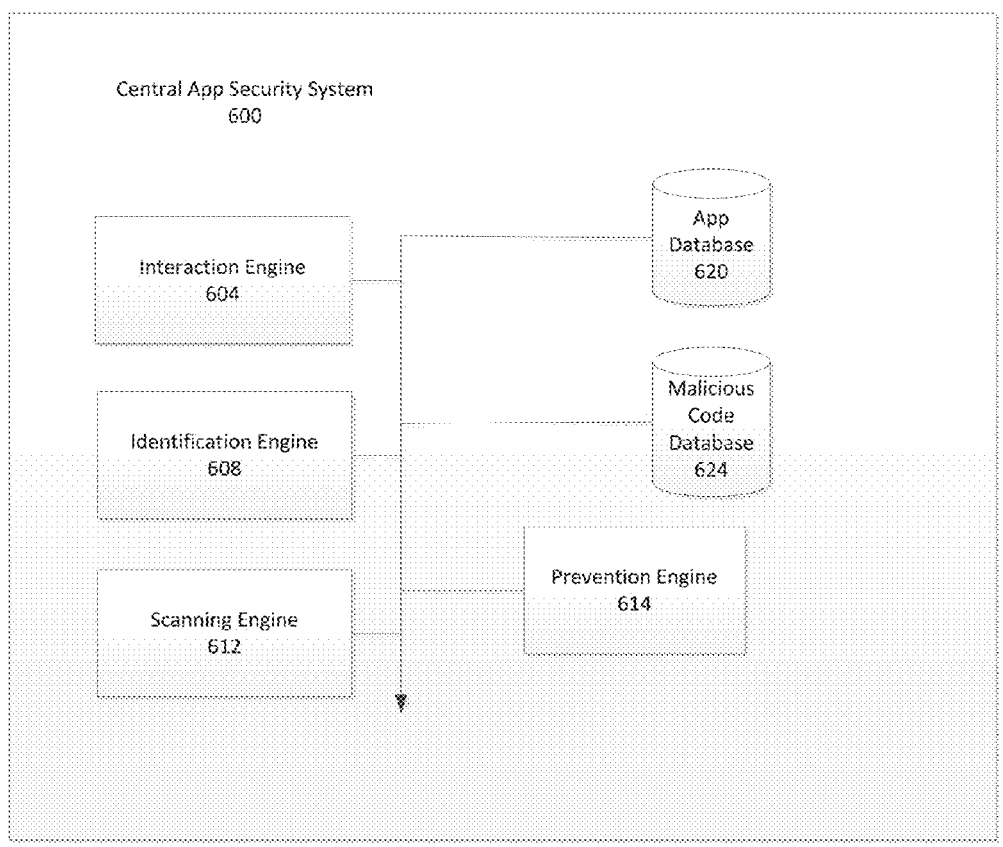
FIG. 6 depicts a block diagram illustrating a central app security system in accordance with an embodiment of the present invention.

FIG. 6 depicts a block diagram illustrating a central app security system in accordance with an embodiment of the present invention. The central app security system 100 includes an interaction engine 604, an identification engine 608, a scanning engine 612, a prevention engine 616, app database 620 and malicious signature database 624. The central app security system 600 operates as a hub in which all requests from mobile apps and devices are received, processed, and responded to. The central app security system 600 also operates as a hub to receive communications from other services internal and external to an associated organization. For instance, where the central app security system 600 is associated with a financial institution, the central app security system 600 can receive and transmit communications to other branches of the financial institution based on the malicious content scanning results. The central app security system 600 may also be capable of receiving communications from other banks, stock market data sources, and other systems.

The interaction engine 604 operates to receive and process all requests received from mobile devices, other systems in the organization, and outside sources. In response to receiving a request, the interaction engine 604 selects and forwards the request to the engine responsible for satisfying the request. In one embodiment, the interaction engine 604 generates a message in accordance with the configurations set by the system administrator and forwards part or all of the information found in a given request to the necessary engine.

The interaction engine 604 will also receive responsive information from the engine(s) of the system and will form the transmission based on the received information. Thus, for instance, the interaction engine 604 will automatically generate a transmission with a structure that would be understood by a given app with which the transmission is directed. The interaction engine 604 will also form messages for other computer systems internal and external to the organizations.

The identification engine 608 responds to requests from apps requesting an app. Thus, as described above with respect to FIG. 3, a device 100 may scan the apps and identify each app's secured formation by analyzing the embedded module or other portions of the app. In one embodiment, the app may transmit the identified secured formation identifier to the central app security system; whereupon the identification engine 608 will compare the identified formation to verify that the identified app is indeed associated with the designated secured formation. In yet another embodiment of the present invention, the use of the identification 608 may be required as part of the process in verifying the designated secured formation because the designated secured formation is encrypted or otherwise secured from public view. This allows only apps that are associated via a common secured formation to recognize the other apps in the secured formation. This technique of obfuscation may be necessary to prevent malicious code from identifying all of the apps in a device that are in a common secured formation and attacking each in parallel.

Figure 7:
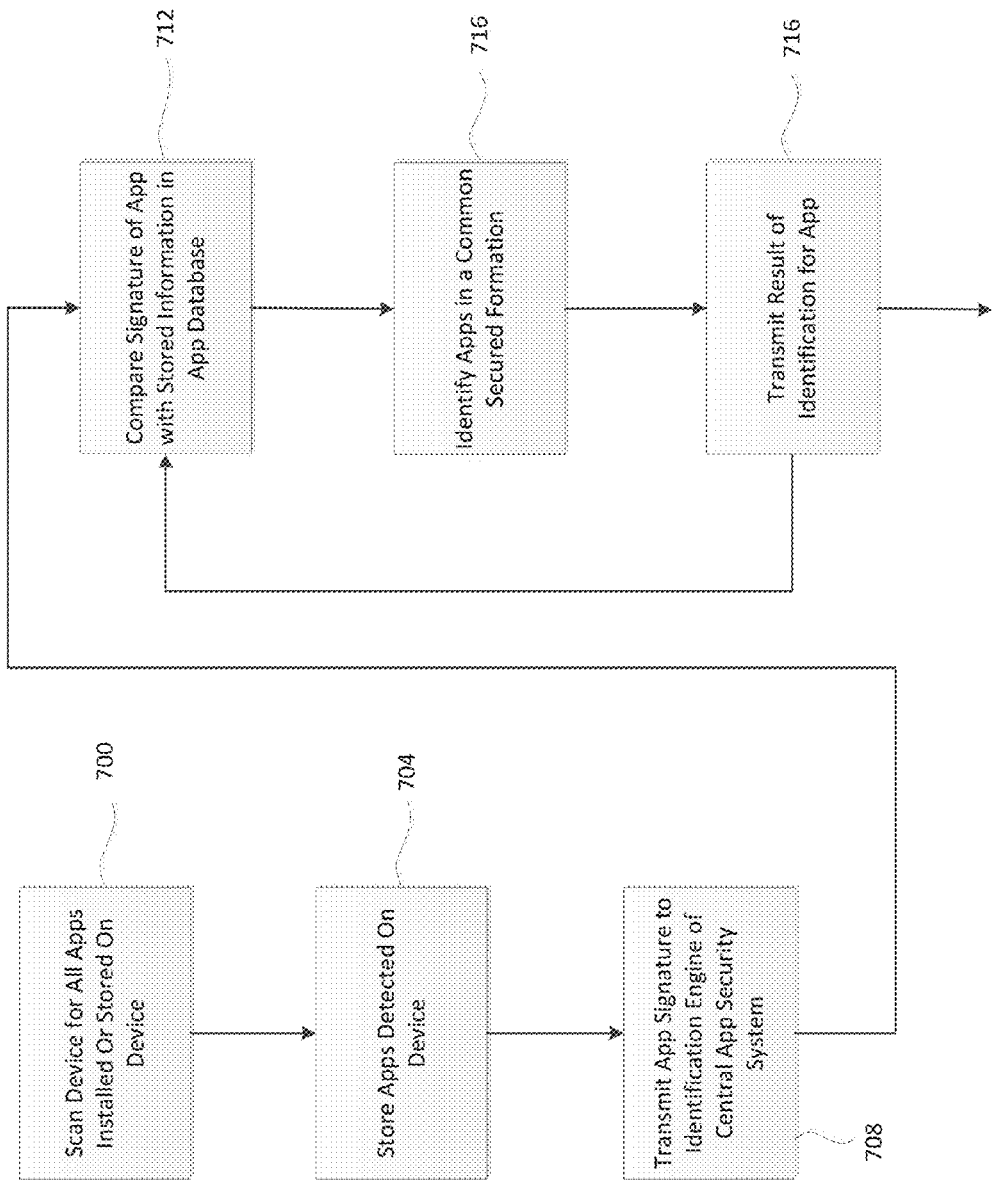
FIG. 7 is a flow chart illustrating an exemplary method for detecting other apps in a device in accordance with another embodiment of the present invention.

FIG. 7 is a flow chart illustrating another exemplary method for detecting other apps in a device in accordance with another embodiment of the present invention. As discussed above with reference to FIG. 2, an app performs (e.g., at 212 of FIG. 2) a scan of device 100 for other apps to be scanned for viruses, malware, spyware, or other malicious code or content. FIG. 7 illustrates steps that may be performed as part of this scan in accordance with an embodiment of the invention where the identification is determined remotely. The operations may also be performed in addition to the steps described with respect to FIG. 3.

At 700, the app may automatically scan all apps installed or stored in the device. Thus, app 104 may detect that there are 20 other apps on device 100, including app 104, 108, 112, and 116. At 704, the app may store, in memory, a list of the apps detected.

The app 104 determines, in iterative fashion, to detect whether a given app includes an embedded security module. To perform this operation, the app 104, at 704, scans the app and generates a unique signature of the app. The signature generated may be similar to that signature generated with respect to FIG. 4 and may be retrieved from the attribute file(s) of a given app. For instance, the app 104 may determine a signature from a digital certificate file; profile of the app; from the private key (PK) file of the app; as well as other attributes of the aps, such as those described above. In at least one other embodiment, the app 104 generates a signature by using one or more files found in the app. The app 104 may be configured to scan the apps for relevant features and files, including images; version information, app identification numbers, and other information. Some or all of this identifying information may be used to generate the signature.

At 708, the app 104, having collected the signature and general app information of all apps found on the device, transmits the information to the central app security system 600. At 712, in response, the central app security system 600, specifically the identification engine 608, compares the information of each app against the information found in the app database 620 to identify the apps on device 100.

At 716, the identification engine 608 determines whether each of the apps on device 100 is part of one or more app formations. Thus, in the example of FIG. 1, the identification engine 608 determines that apps 104, 108, 112 and 116 are all part of the same formation, and therefore, these apps will work in collective fashion to protect one another to ensure the integrity of each app in the formation.

At 720, the central app security engine 600 responds to the device 100 with a transmission that identifies the apps found in the formation. Thus, at 724, app 104 detects that apps 108, 112 and 116 all belong to the same formation and stores that information in memory for subsequent use. At 728, the process of scanning the device to detect apps in the formation terminates.

Thus, the identification engine 608 may be found in embodiments of the central app system 600 where identification of apps in a secured formation is done remotely at the central app security system 600. The identification engine 608 performs this identification with the help of the app database 620, which may include information of all apps that are associated with one or more secured formations. Thus, the app database 620, for each app found in one or more formations, will include information that identifies the app, including the app name, signature, creating company, version, identification number, and other relevant information.

In one embodiment, the app database 620 is not limited to those apps that are found in one or more formations supported by the system, but rather, includes information of all available apps. A database with comprehensive information of all apps may be useful in embodiments of the present invention that also scan the integrity of one or more apps not found in any supported formation. Thus, these embodiments may dynamically protect the integrity of all of the apps on the device.

Scanning engine 612 facilitates the scanning process of apps for viruses, malware, spyware, and other malicious code or content. In one embodiment, the scanning engine performs a comparison of an app signature with the signature of the app found in the app database 620.

In at least one embodiment of the present invention, scanning engine 612 selects one of a plurality of scanning techniques available to the system, including, but not limited to, a simple hash scanning technique; a thorough static analysis; dynamic analysis; or others techniques. The selection by the scanning engine 612 may be dependent on any number of factors, including the app currently performing the scan; the number of apps in the formation; the time since the last scan of the same type; the type of device; whether the device is plugged in; activities, processing, and resources active in the device at the time; and other attributes.

In one embodiment, scanning engine 612 is further configured to compare the received app signature against a plurality of signatures of known viruses, malware, spyware, or other malicious code or content stored at malicious signature database 624. This operation may also be performed after the scanning engine 612 performs a comparison of the signatures found in app database 620.

Scanning engine 612 is further configured to automatically update the app database 620 and malicious signature database 624. In on embodiment, scanning engine 612 automatically updates the information found in these databases based on scan results performed by the apps. For instance, the scanning engine 612 may automatically add a signature of a malicious app through a command by the central app security system 600 after a determination that a specific app includes malware.

The scanning engine 612 may also be configured to automatically retrieve updated signatures of new versions of apps released to the public. Thus, in this embodiment, the scanning engine 612 automatically retrieves newly-released versions of apps, processes the app to generate the updated signature, and stores the signature in the app database 620 and/or malicious signature database 624 (where the updated version is known to include malicious code).

In certain embodiments, the central app security system 600 further includes a prevention engine 616 that determines the proper response to a detection of malicious code and further provides operations for the purpose of preventing additional damage to the system, user and company. The prevention engine 616 may determine that the app can be repaired, can be reinstalled, or must be removed. The prevention engine 616 will also facilitate the repair process where possible by automatically retrieving and transmitting some or all portions of an app necessary to repair the app at a given device.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 8:
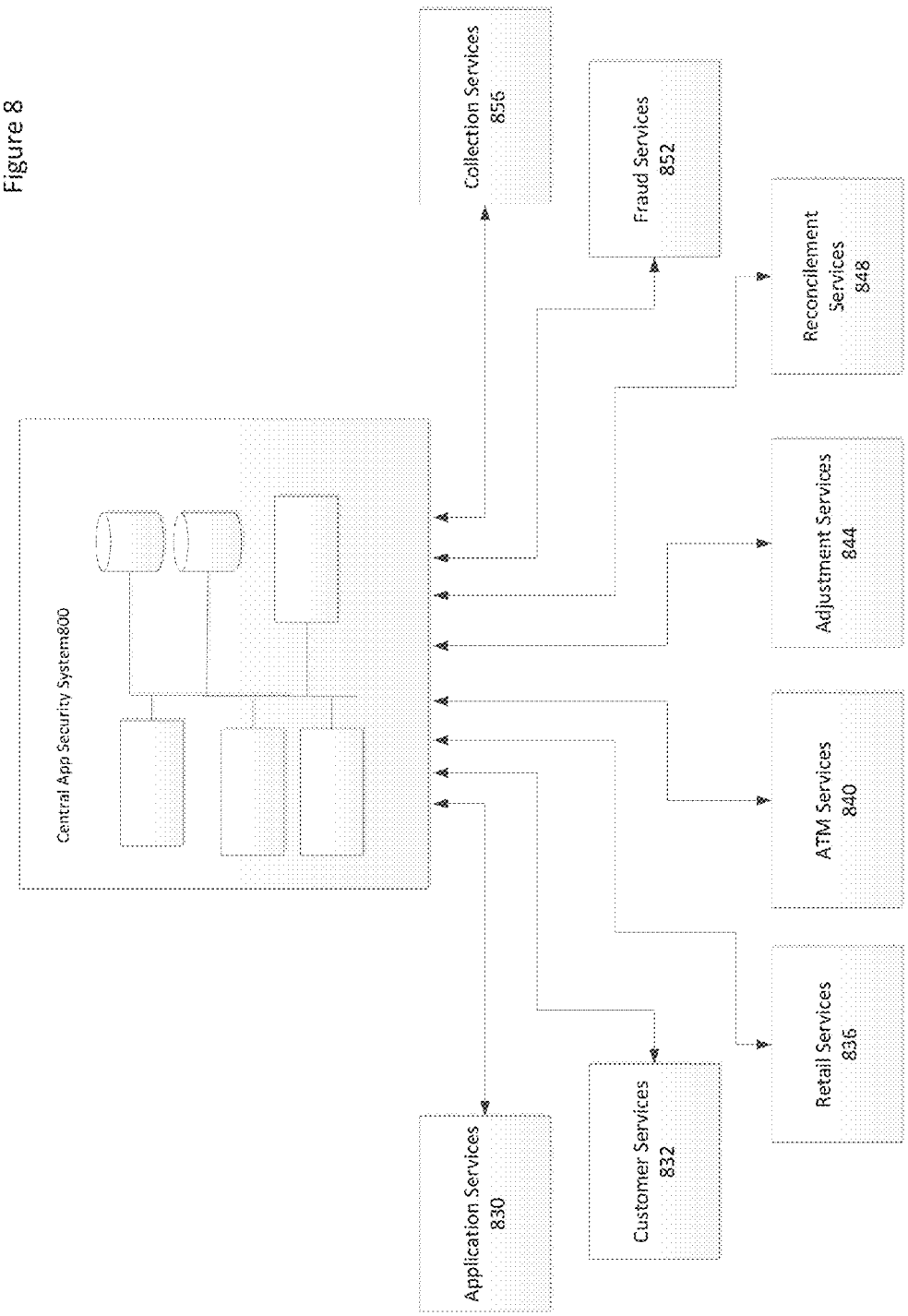
FIG. 8 depicts a block diagram illustrating a central app security system with connections to internal and external systems in accordance with an embodiment of the present invention.

FIG. 8 depicts a block diagram illustrating a central app security system with connections to internal and external systems in accordance with an embodiment of the present invention. Where the organization is a financial institution, for instance, the central app security system 800 may be connected to a plurality of channels and a plurality of business unit systems 830-856. The central app security system 800 may further have access to a plurality of business applications, services and tools, which shall be referred to herein collectively as applications. These applications may reside at or otherwise utilize data stored at a system connected to the central app security system 800. Thus, at least some of the applications may reside at or provide access to the resources at business unit systems 830-856 at the organization, such as an application services system 830, customer services system 832, retail services system 836, ATM services system 840, adjustment services system 844, reconcilement services system 848, fraud services system 852, and collection services system 856.

The central app security system 800, in this embodiment, can perform additional actions at the organization in order to prevent any damage that may have resulted as a consequence of a malicious code. The central app security system 800 may also perform actions to preempt any future malicious operations as a result of the malicious code. The central app security system 800 operates dynamically based on the context and circumstances, including based on the app in which the malicious code was found, the associated secured formation, the malicious code identified, the operations actually or potentially performed by the malicious code and/or infected app; and recent activities detected in associated account(s) and system(s). Thus, for example, the central app security system 800 will notify different business units based on the infected app.

By way of example, to fix any damage that may have resulted as a consequence of the malicious code, the central app security system 800 may communicate the information identifying the malicious code, the originating device, the user associated with the device, time of installation, and/or known history of actions that may have been collected from the device to one or more relevant business units. If the app is an app that allows users to access a user's bank account, make money transfers, and perform account operations, the central app security system 800 may notify the fraud services system 862, retail services 836, and/or ATM services system 840 of the potential for fraud, for instance. The central app security system 800, thus, may cause these systems to freeze accounts of the associated user, review the recent transactions for potential fraud, and notify the user of potential fraud.

As another example, to preempt any malicious operations as a result of the malicious app, the central app security system 800 may communicate the app's identification to all of the relevant business unit systems so that these systems may block or suspend any future operations received from the infected app and associated malicious code. Furthermore, the central app security system 800 may communicate the user's information to these branches so that more thorough scans of the account associated with these apps may be reviewed for potentially fraudulent behavior.

The central app security system 800 could also communicate with third party systems that are potentially involved in one or more transactions with the infected user, app, and device, so that review of any recent transactions involving these organizations may also be reviewed.

The prevention engine of the central app security system 800 may also be configured to dynamically maintain the app database. In an embodiment of the present invention, the prevention engine may scan the attribute file(s) of existing and/or new apps, including, for example, the development region, the displayed name of the app, the bundle executable, the identification of the app icon, the version, the supported operating system version, the display size of the app, copyright information, and so on. Based on some or all of this information, the prevention engine app may dynamically determine whether other apps are or should be associated with a common secured formation based on the content of each file.

Figure 9:
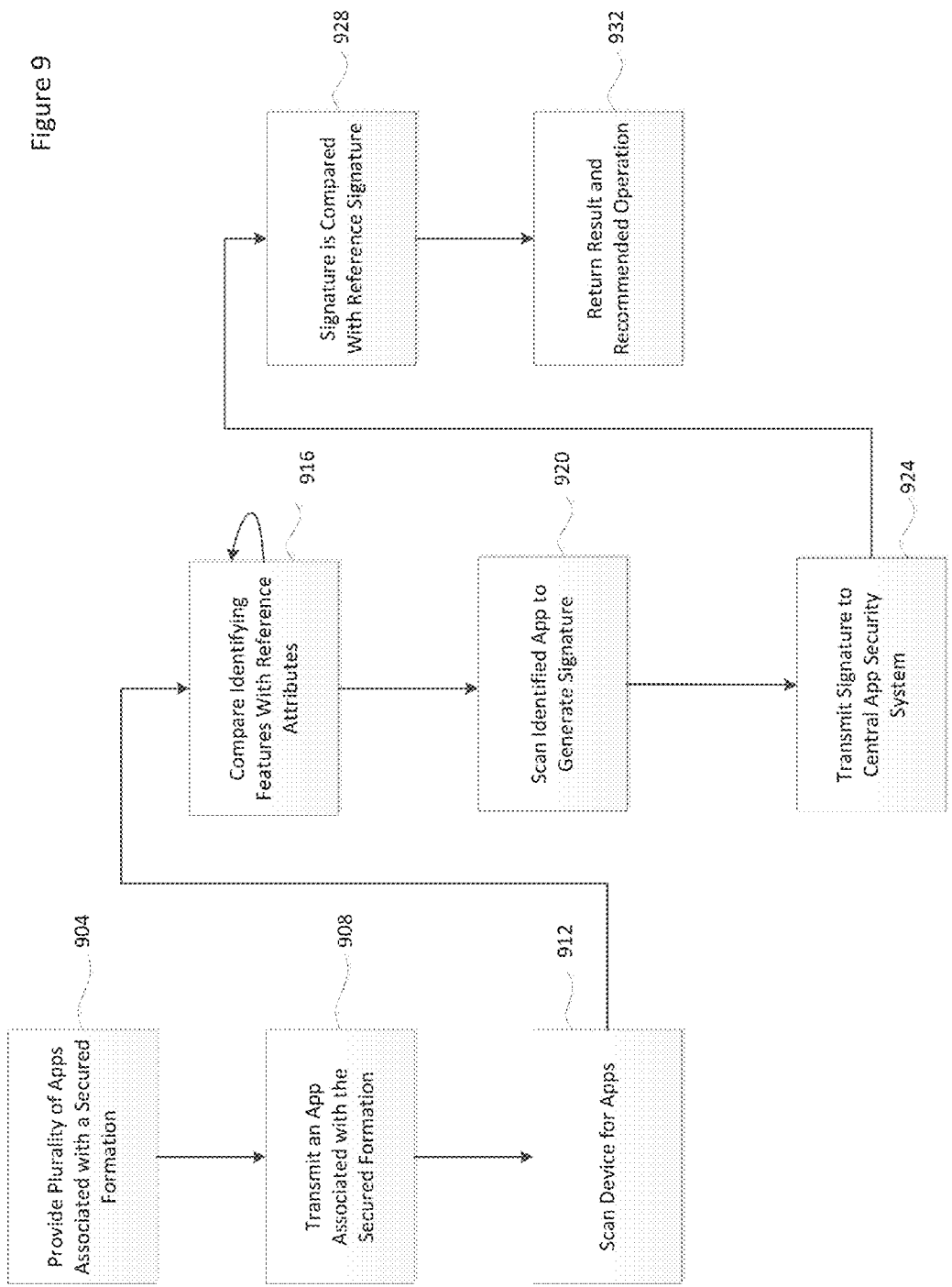
FIG. 9 is a flow chart illustrating another method for providing a formation of apps with embedded security modules in accordance with another embodiment of the present invention.

FIG. 9 is a flow chart illustrating another method for providing a secured formation of apps with embedded security modules in accordance with an embodiment of the present invention. As provided below, embodiments of the present invention are further capable of detecting when other apps not part of a formation of apps are replicated versions of one or more apps in a secured formation. Thus, this embodiment allows an organization, such as a financial institution, to automatically detect when fraudulent apps have been released to the public that attempt to replicate the look and feel as well as the functionality of the organization's apps in order to defraud and steal sensitive information from the customer devices.

Figure 10:
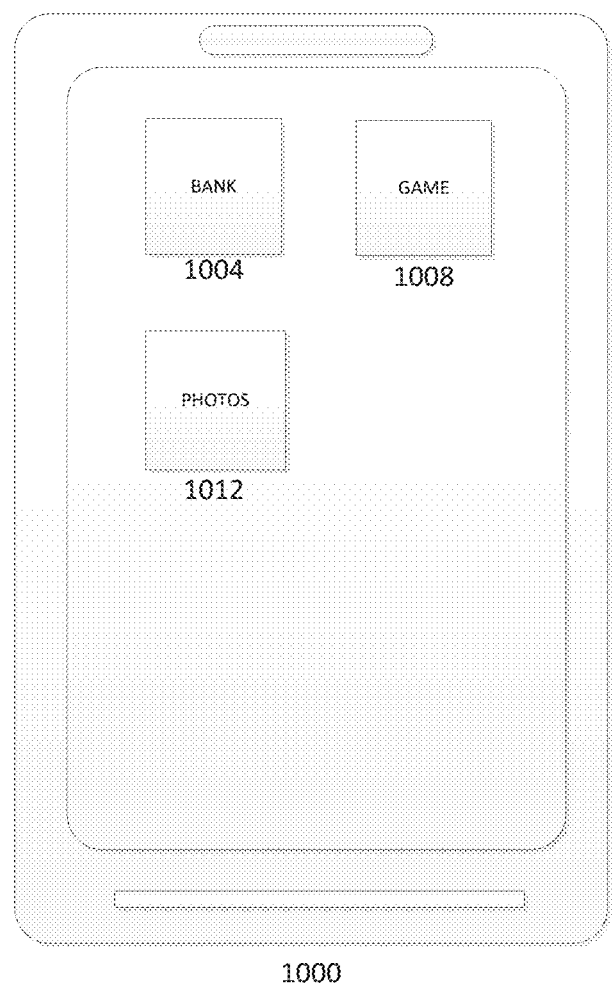
FIG. 10 depicts an exemplary mobile device containing a plurality of apps with self-protecting code in accordance with an embodiment of the present invention.

At 904, a formation of apps is provided on an app store, such as the Apple App Store, Google Play Store, Microsoft Window Store, and other application repositories. At 908, one or more apps are downloaded and installed on a user device. FIG. 10 illustrates a smartphone device 100 comprising of app 1004, along with apps 1008 and 1012 that are also on the device where app 1012 is not associated with the same secured formation.

At 912, in response to a user using app 1004, the app, during operation, performs a scan of device 1000. The scan may be performed in the background and as a secondary operation to the primary app operation. The app 1004 performs a scan of all apps on the device and collects information concerning the apps. The information collected includes, but is not limited to, app name, signature, creating company, version, identification number, and other relevant information. Furthermore, the app 1004 scans the apps for other identifying features, including logos and images, version information, app identification numbers, and other information. Some or all of this identifying information may be used.

At 916, app 1004 compares the identifying features of each app with one or more reference attributes stored either with the app or remotely at the central app security system. By way of example, at 916, the app 1004 compares each of the images identified for the app to determine whether images detected in the app-in-question is or, at least, closely resembles a logo of the financial institution. Furthermore, the app 1004 may check whether the app includes a similar name and/or includes the name of the financial institution. In one embodiment, the app 1004 may also determine whether the app includes or access an internet address (e.g., URL) that is associated with or resembles an address of the financial institution. One or more comparisons can be made and a determination of whether there is enough similarity to raise a flag that would prompt additional analysis. For instance, a score can be generated based on the comparison.

Where the app 1004 determines that there is sufficient similarity, such as when the comparison score results in a score that is greater than a threshold score, then additional analysis of the app is warranted. At 920, after determining that the app includes images of the financial institution, the app 1004 may automatically scan the app-in-question to generate a signature representing the app.

At 924, the app 1004 may then transmit a request to the central app security system to determine whether the app is a genuine app. At 928, to determine whether an app is a genuine version of an app or is a fraudulent, replicated version, the app may utilize the identifying information of the app-in-question to identify one or more entries in the app database that resemble the app-in-question.

At 928, a comparison of signatures of each potential match is compared with the signature of the app-in-question. Where there is a match, the analysis ends there. However, where there is no match, then there is a high likelihood that the app-in-question is a fraudulent app.

At 932, the results and a recommended responsive action are transmitted by the central app security system based on this detection. The central app security system may record the entry for further analysis by an administrator and notify the user that the app installed on the user's device may be a fraudulent app that is not associated with the financial institution. The central app security system may also cause the app to be uninstalled from the user's device.

Figure 11:
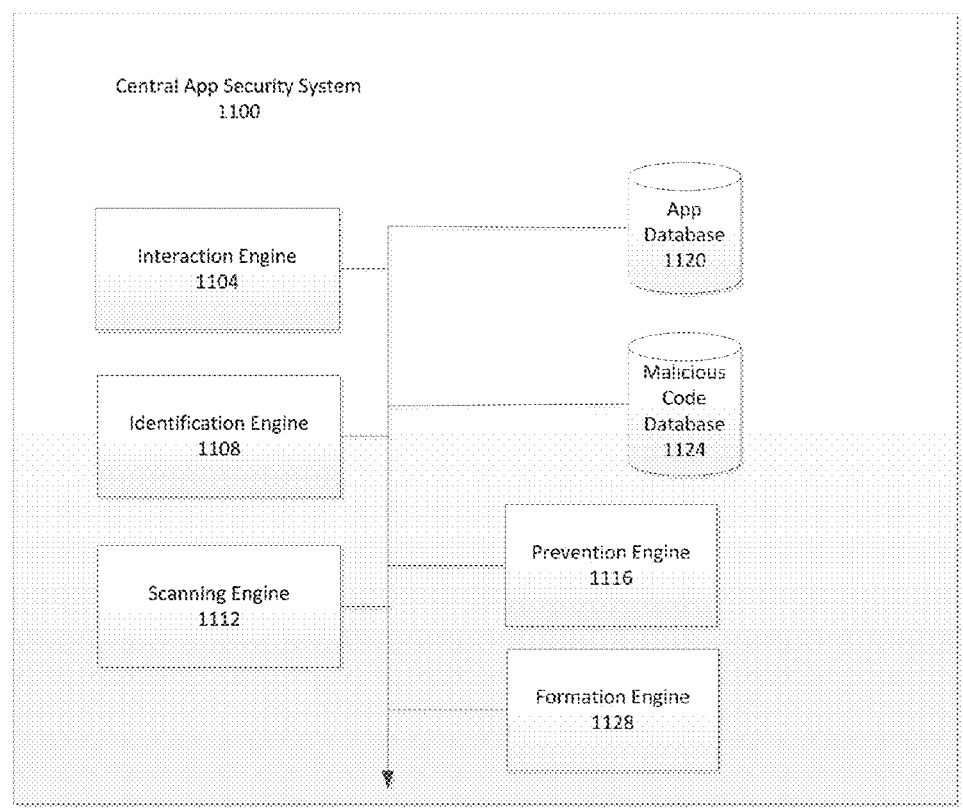
FIG. 11 depicts a block diagram illustrating a central app security system in accordance with another embodiment of the present invention.

As depicted in FIG. 11, the central app security system, in accordance with an embodiment of the present invention, further includes a formation engine for managing the apps that are associated with one or more formations. Thus, in addition to an interaction engine 1004, an identification engine 1008, a scanning engine 1012, a prevention engine 1016, app database 1020 and malicious code database 1024, the central app security system 600 further includes a formation engine 1028.

The formation engine 1028 allows an administrator to create new formations or modify existing formations by associating or disassociating formations with one or more apps.

The formation engine 1028 may further automatically manage formations by dynamically updating the app database based on the apps detected on a plurality of app stores as well as information received in requests received from mobile devices. Thus, in one embodiment, the formation engine automatically detects that a new app has been published to an app store. The formation engine 1028 retrieves the app and downloads the app to detect one or more embedded code modules through methods discussed herein and those known in the art. The formation engine may scan attribute files associated with the app. Upon determination that the new app includes embedded security module, the formation engine may scan the app in more detail to determine what formation, if any, should the app be associated with.

Upon determining that the app is associated with a formation, the formation engine 1028 will update the app database to include this information. The formation engine 1028 may also process the app to generate additional information including one or more signatures, and other identifying information used in the processes described above.

In one embodiment, the formation engine 1028 may transmit a request to an external computer system associated with the new app to verify that the app should be associated with the identified formation. In this manner, the central app security system 600 may dynamically provide up-to-date formation information regarding apps available in the marketplace.

It should be readily apparent that some or all of the operations that are described herein as being performed by an app on a device may be performed by the central app security system and, likewise, some or all of the operations that are described herein as being performed by the central app security system may be performed by an app that is scanning the system.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A system for providing an app formation comprising a plurality of apps embedded with a security module, the system comprising:
   non-transitory computer memory storing at least executable computer instructions and an app database comprising identifying information of at least the plurality of apps associated with the app formation;
   at least one computer processor, the computer processor executing executable computer instructions to perform operations associated with an app identification engine and a scanning engine;
   wherein the app identification engine executes executable computer instructions using at least one computer processor at the system to identify the plurality of apps on the user device, each of the plurality of apps on the user device including an embedded security module that designates the app formation, and
   wherein the scanning engine receives a first request from a code module embedded in a first app associated with the app formation; and
   wherein, in response to receiving a first request from a code module embedded in a first app associated with the app formation, the at least one computer processor is automatically activated to perform at least the following operations: processing the first request from the first app by scanning each of the other apps associated with the app formation for malicious code;
   returning a first response to the first request based on said processing step;
   receiving a second request from a code module embedded in a second app associated with the app formation;
   processing the second request from the second app by scanning each of the other apps associated with the app formation for malicious code; and
   returning a second response to the second request based on said processing step.

2. A system for providing an app formation comprising a plurality of apps embedded with a security module of claim 1, wherein the scanning engine executes executable computer instructions using the at least one computer processor to further perform at least the following:
   comparing a signature of the second app with the signature of an app stored in the app database in response to processing the first request from the first app; and
   comparing a signature of the first app with the signature of an app stored in the app database in response to processing the second request from the second app.

3. The system for providing an app formation comprising a plurality of apps embedded with a security module of claim 2, wherein a signature is generated by processing an app in accordance with a hash function.

4. The system for providing an app formation comprising a plurality of apps embedded with a security module of claim 2, wherein a signature comprises at least one of the following:
   an image included in the second app;
   a video included in the second app;
   a web address identified in the second app;
   a term or phrase identified in the second app;
   app identification value of the second app;
   corporate association of the second app; and
   version of the second app.

5. The system for providing an app formation comprising a plurality of apps embedded with a security module of claim 1, wherein the scanning engine receives a request from each of the apps associated with the app formation.

6. The system for providing an app formation comprising a plurality of apps embedded with a security module of claim 1, wherein the scanning engine executes executable computer instructions using the at least one computer processor to further perform at least one of the following:
   cause the embedded code module of the first app to statically analyze at least one of the other apps associated with the app formation; and
   cause the embedded code module of the first app to dynamically analyze at least one of the other apps associated with the app formation.

7. The system for providing an app formation comprising a plurality of apps embedded with a security module of claim 1, wherein the first response comprises at least one of the following:
   an instruction to the user device to repair an app associated with the app formation on the user device;
   an instruction to the user device to reinstall an app associated with the app formation on the user device; and
   an instruction to the user device to uninstall an app associated with the app formation on the user device.

8. The system for providing an app formation comprising a plurality of apps embedded with a security module of claim 1, further comprising:
   a malicious app database stored in memory storing a plurality of signatures that identifies
   one or more malicious apps
   wherein said processing the scan request from the first app comprises:
   comparing a signature of the second app with the signature stored in the malicious app
   database in response to the step of processing the first request.

9. The system for providing an app formation comprising a plurality of apps embedded with a security module of claim 1, further comprising:
   a formation engine that executes executable computer instructions using the at least one computer processor to associate a third app embedded with a security module with the app formation based on the signature of the third app.

10. The system for providing an app formation comprising a plurality of apps embedded with a security module of claim 1, further comprising:
    a prevention engine that executes executable computer instructions using the at least one computer processor to communicate a fraud alert message with at least one business unit associated with the system.

11. The system for providing an app formation comprising a plurality of apps embedded with a security module of claim 1, wherein the fraud alert message includes information identifying the app associated with identified malicious code.

12. A computer readable storage medium comprising instructions of a first code module of a first app associated with a predetermined set of apps that, when executed on a first computing device, cause the first computing device to perform at least the following:
    receiving, over a communication network, identifying information relating to the predetermined set of apps;
    receiving an activation of the first app on the first computing device;
    wherein, in response to receiving, over a communication network, identifying information relating to the predetermined set of apps and the activation of the first app on the first computing device, at least one processor of the first computing device is automatically activated to perform at least the following:
  identifying, using at least one processor of the first computing device, other apps on the first computing device;
  determining, based on step of identifying, other apps on the first computing device associated with the predetermined set of apps;
  scanning each of the identified apps on the first computing device associated with the predetermined set of apps to detect malicious code;
  detecting that at least one of the identified apps on the first computing device associated with the predetermined set of apps includes malicious code; and
  removing at least the malicious code from the device.

13. The computer readable storage medium of claim 12, further comprising instructions of a second code module of a second app associated with the predetermined set of apps that, when executed on the first computing device, cause the first computing device to perform at least the following:
  identifying, using at least one processor of the first computing device, other apps on the first computing device;
  determining, based on the step of identifying, apps on the first computing device associated with the predetermined set of apps, said identified app includes the first app; and
  scanning each of the identified apps on the first computing device associated with the predetermined set of apps to detect malicious code.

14. The computer readable storage medium of claim 12, wherein the operation of scanning further comprises:
  comparing a signature of each of the identified apps with signatures in a signature database stored on the first computing device to detect malicious code.

15. The computer readable storage medium of claim 12, wherein the operation of scanning further comprises:
  transmitting a request to a remote server to scan at least one of the identified apps on the first computing device associated with the predetermined set of apps to detect malicious code; and
  receiving a response from the remote server.

16. The computer readable storage medium of claim 12, wherein the transmitting of the scan request causes the remote server to compare a signature of each of the identified apps with signatures stored in an app database associated with the apps in the predetermined set of apps.

17. The computer readable storage medium of claim 12, wherein the transmitting of the scan request causes the remote server to compare a signature of each of the identified apps with signatures stored in a malicious app database.

18. The computer readable storage medium of claim 12, wherein the scan request includes at least the signature of each of the identified apps.

19. The computer readable storage medium of claim 12, wherein the scan request includes information of each of the identified apps.

20. The computer readable storage medium of claim 12, wherein the operation of scanning further comprises:
  comparing identifying information of each of the identified apps with identifying information in a database stored on the first computing device to detect malicious code.

21. The computer readable storage medium of claim 20, wherein the identifying information comprises at least one of the following of each of the identified apps:
  an image;
  a video;
  a web address;
  a term or phrase;
  app identification value;
  corporate association; and
  version.

22. The computer readable storage medium of claim 12, further comprising instructions of a code module for each of a plurality of apps associated with the predetermined set of apps.

23. The computer readable storage medium of claim 12, wherein the operation of scanning comprises at least one of the following:
  statically analyzing at least one of the other apps in the predetermined set of apps on the user device; and
  dynamically analyzing at least one of the other apps in the predetermined set of apps on the user device.

24. The computer readable storage medium of claim 12, wherein the operation of removing further comprises at least one of the following:
  uninstalling an app of the plurality of apps on the user device associated with the predetermined formation;
  reinstalling an app of the plurality of apps on the user device associated with the predetermined formation; and
  repairing an app of the plurality of apps on the user device associated with the predetermined formation.

* * * * *